(12) United States Patent
Wang et al.

(10) Patent No.: US 11,855,488 B2
(45) Date of Patent: Dec. 26, 2023

(54) MOTOR ROTOR STRUCTURE AND PERMANENT MAGNET MOTOR

(71) Applicant: GREE ELECTRIC APPLIANCES, INC. OF ZHUHAI, Zhuhai (CN)

(72) Inventors: Min Wang, Zhuhai (CN); Bin Chen, Zhuhai (CN); Yong Xiao, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 416 days.

(21) Appl. No.: 17/277,730

(22) PCT Filed: Sep. 2, 2019

(86) PCT No.: PCT/CN2019/103974
§ 371 (c)(1),
(2) Date: Mar. 19, 2021

(87) PCT Pub. No.: WO2020/093773
PCT Pub. Date: May 14, 2020

(65) Prior Publication Data
US 2021/0351646 A1    Nov. 11, 2021

(30) Foreign Application Priority Data

Nov. 8, 2018   (CN) .......................... 201811324647.4

(51) Int. Cl.
*H02K 1/276*   (2022.01)
(52) U.S. Cl.
CPC ......... *H02K 1/276* (2013.01); *H02K 2213/03* (2013.01)
(58) Field of Classification Search
CPC ... H02K 1/276; H02K 1/2773; H02K 2213/03
See application file for complete search history.

(56) References Cited

U.S. PATENT DOCUMENTS

| | | | |
|---|---|---|---|
| 11,336,135 B2* | 5/2022 | Wang | H02K 21/046 |
| 2009/0236923 A1* | 9/2009 | Sakai | H02K 21/16 |
| | | | 310/156.43 |

FOREIGN PATENT DOCUMENTS

| | | |
|---|---|---|
| CN | 102118089 A | 7/2011 |
| CN | 108023421 A | 5/2018 |

(Continued)

OTHER PUBLICATIONS

Japanese Patent Office Action, Office Action Issued in Application No. 2021-514993 dated May 31, 2022, 3 pages.

*Primary Examiner* — Dang D Le
(74) *Attorney, Agent, or Firm* — KILPATRICK TOWNSEND & STOCKTON, LLP

(57) ABSTRACT

A motor rotor structure including a rotor core. Multiple first permanent magnet slots are disposed in the rotor core in a circumferential direction. At least one second permanent magnet slot is disposed between every two adjacent first permanent magnet slots; each of the first permanent magnet slots and an adjacent second permanent magnet slot thereof are spaced a preset distance apart. Between two kinds of permanent magnets having different coercivities, a first kind of permanent magnet is mounted in each of the first permanent magnet slots and a second kind of permanent magnet is mounted in the second permanent magnet slot. When identical polarities of adjacent two kinds of permanent magnets having different coercivities face each other, the rotor core is in a more-magnetic-pole state. When contrary polarities of adjacent two kinds of permanent magnets having different coercivities face each other, the rotor core is in a fewer-magnetic-pole state.

18 Claims, 7 Drawing Sheets

(56) References Cited

FOREIGN PATENT DOCUMENTS

| | | |
|---|---|---|
| CN | 108110980 A | 6/2018 |
| CN | 109301958 A | 2/2019 |
| CN | 208849566 U | 5/2019 |
| JP | 2013034317 A | 2/2013 |
| WO | 2009104553 A1 | 8/2009 |

* cited by examiner

MOTOR ROTOR STRUCTURE AND PERMANENT MAGNET MOTOR

RELATED APPLICATION

The present application claims the priority of Chinese Patent Application No. 201811324647.4, filed on Nov. 8, 2018, with the title of "MOTOR ROTOR STRUCTURE AND PERMANENT MAGNET MOTOR", the entire content of which is incorporated herein by reference. This application is a national phase under 35 U.S.C. § 120 of international patent application PCT/CN2019/103974, entitled "MOTOR ROTOR STRUCTURE AND PERMANENT MAGNET MOTOR" filed on Sep. 2, 2019, the content of which is also hereby incorporated by reference.

FIELD

The present disclosure relates to the field of motor technologies, more particularly, to a motor rotor structure and a permanent magnet motor.

BACKGROUND

A magnetic-flux adjustable permanent magnet synchronous motor adjusts the intensity of an internal magnetic field of the motor according to a load of the motor. A permanent magnet motor in the related art provide magnetic flux by means of permanent magnets, but the magnetic field generated by the permanent magnets is fixed, so it is difficult to adjust an internal magnetic field of the motor, making it difficult for the permanent magnet motor to balance efficiency at a high frequency and efficiency at a low frequency. Moreover, in the case of a fixed power supply voltage, the maximum operating frequency of the motor is limited. At present, the operating ranges of most permanent magnet motors can be expanded only by means of a flux weakening control, but the flux weakening control causes problems of increasing motor copper loss, reducing motor efficiency, limiting a speed regulation range, and the like.

SUMMARY

Based on this, it is necessary to provide a motor rotor structure and a permanent magnet motor in view of the problems of increasing motor copper loss, reducing motor efficiency, limiting a speed regulation range, and the like when an operating range of a permanent magnet motor in the related art is expanded by means of a flux weakening control.

A motor rotor structure includes a rotor core, and at least two first permanent magnet slots are disposed in the rotor core in a circumferential direction. At least one second permanent magnet slot is disposed between every two adjacent first permanent magnet slots; each of the first permanent magnet slots and an adjacent second permanent magnet slot thereof are spaced a preset distance apart.

Between two kinds of permanent magnets having different coercivities, a first kind of permanent magnet is mounted in each of the first permanent magnet slots, and a second kind of permanent magnet is mounted in the second permanent magnet slot. When identical polarities of adjacent two kinds of permanent magnets having different coercivities face each other, the rotor core is in a more-magnetic-pole state. When contrary polarities of adjacent two kinds of permanent magnets having different coercivities face each other, the rotor core is in a fewer-magnetic-pole state.

In some embodiments, each of the first permanent magnet slots is a radial slot arranged in a radial direction of the rotor core, and the first kind of permanent magnet mounted in each of the first permanent magnet slots is magnetized in a tangential direction of the rotor core.

In some embodiments, the second permanent magnet slot is a tangential slot arranged in a tangential direction of the rotor core. The second permanent magnet slot is proximate to an outer circle of a rotor. The second kind of permanent magnet mounted in the second permanent magnet slot is magnetized in a radial direction of the rotor core.

In some embodiments, the two permanent magnets having different coercivities include a lower-coercivity permanent magnet and a higher-coercivity permanent magnet. The lower-coercivity permanent magnet is mounted in each of the first permanent magnet slots. The higher-coercivity permanent magnet is mounted in the second permanent magnet slot.

In some embodiments, two second permanent magnet slots are disposed between every two adjacent first permanent magnet slots. Contrary polarities of two higher-coercivity permanent magnets mounted in the two second permanent magnet slots face each other. A flux barrier slot is disposed between the two second permanent magnet slots.

In some embodiments, the lower-coercivity permanent magnet has a coercivity H1 and a thickness d1. The higher-coercivity permanent magnet has a coercivity H2 and a thickness d2, and $d2 \times H2/H1 \times 0.9 < d1 < d2 \times H2/H1 \times 1.1$ is satisfied.

In some embodiments, the lower-coercivity permanent magnet has residual magnetism Br1 and a width L1. The higher-coercivity permanent magnet has residual magnetism Br2 and a width L2, and $L2 \times Br2/Br1 \times 0.1 < L1 < L2 \times Br2/Br1 \times 0.5$ is satisfied.

In some embodiments, the flux barrier slot has a thickness ranging from 2 g to 10 g, and g denotes an air gap of the motor.

In some embodiments, one second permanent magnet slot is disposed between every two adjacent first permanent magnet slots.

In some embodiments, the lower-coercivity permanent magnet has a coercivity H3 and a thickness d3. The lower-coercivity permanent magnet has a coercivity H4 and a thickness d4; and $d4 \times H4/H3 \times 0.9 < d3 < d4 \times H4/H3 \times 1.1$ is satisfied.

In some embodiments, the lower-coercivity permanent magnet has residual magnetism Br3 and a width L3. The higher-coercivity permanent magnet has residual magnetism Br4 and a width L4, and $L4 \times Br4/Br3 \times 0.3 < L3 < L4 \times Br4/Br3 \times 0.7$ is satisfied.

A permanent magnet motor includes a stator core and a motor rotor structure, and the motor rotor structure is the motor rotor structure of any one of the solutions described above.

The present disclosure has the following beneficial effects:

Two kinds of permanent magnets having different coercivities are provided, so that an internal magnetic field of a motor rotor can be adjusted according to a requirement. When the motor operates at a low-speed and large-torque state, the motor changes a magnetization direction of the permanent magnet with the relatively lower coercivity in the rotor core by means of an armature current, so that the rotor core is in a more-magnetic-pole state. In this case, the number of magnetic poles of the motor is relatively large, and the torque generated is relatively large. When the motor operates at a high-speed and small-torque state, the motor changes the magnetization direction of the permanent magnet with the relatively lower coercivity in the rotor core by means of an armature current, so that the rotor core is adjusted to be in a fewer-magnetic-pole state. In this case, the number of magnetic poles of the motor is reduced, and the generated torque is relatively small, but at a same electrical frequency, the rotation speed increases. Therefore, the motor rotor structure is able to adjust an internal magnetic field according to the operation condition of the motor, so that the rotor core has a more-magnetic-pole state and a fewer-magnetic-pole state, increasing a high-efficiency region of the motor and expanding an operation range of the motor.

BRIEF DESCRIPTION OF THE DRAWINGS

In order to more clearly illustrate the embodiments of the present disclosure, the accompanying drawings used in the description of the embodiments will be briefly introduced below. It is appreciated that, the accompanying drawings in the following description are only some embodiments of the present disclosure.

DETAILED DESCRIPTION OF THE EMBODIMENTS

The embodiments of the present disclosure will be clearly and fully described below with reference to the drawings in the embodiments of the present disclosure. It is apparent that the embodiments described are merely a part of rather than all of the embodiments of the present disclosure.

It should be noted that when one element is referred to as "attached to" another element, it may be directly disposed on the other element or an intermediate element may exist. When one element is considered to be "connected to" another element, it may be directly connected to the other element or an intermediate element may co-exist. Conversely, when an element is referred to as "directly" "on" another element, no intermediate element exists. The terms "vertical", "horizontal", "left", "right" and similar expressions used herein are for illustrative purposes only.

Figure 1:
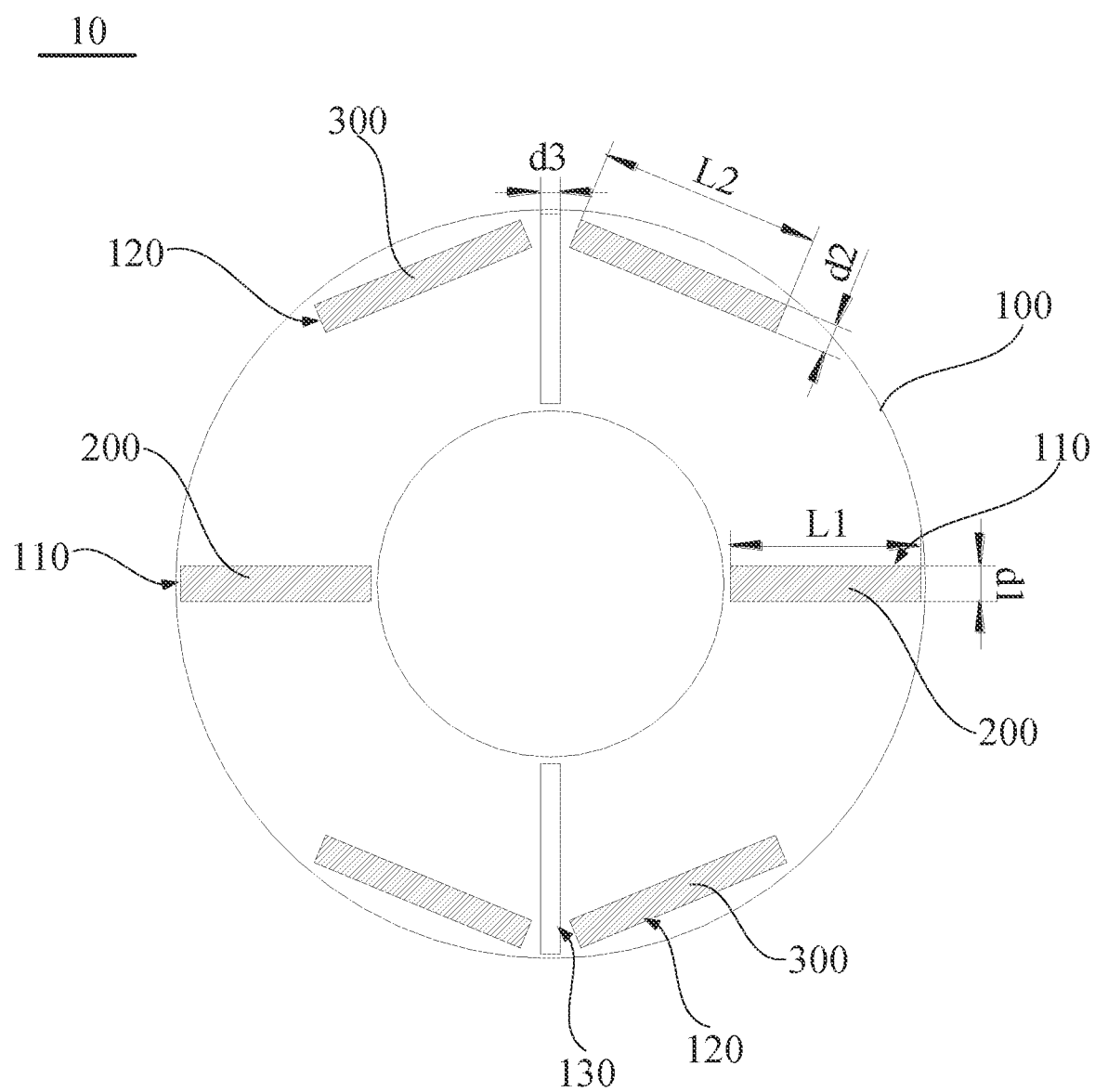
FIG. 1 is a schematic structural diagram illustrating a motor rotor structure according to an embodiment of the present disclosure.

Referring to FIG. 1, a motor rotor structure 10 according to an embodiment of the present disclosure includes a rotor core 100 and two kinds of permanent magnets having different coercivities. At least two first permanent magnet slots 110 are disposed in the rotor core 100 in a circumferential direction. At least one second permanent magnet slot 120 is disposed between every two adjacent first permanent magnet slots 110, and each first permanent magnet slot 110 and an adjacent second permanent magnet slot 120 thereof are spaced a preset distance apart. Between the two kinds of permanent magnets having different coercivities, one kind of permanent magnet is mounted in the first permanent magnet slot 110, and another kind of permanent magnet is mounted in the second permanent magnet slot 120. When the identical polarities of adjacent two kinds of permanent magnets having different coercivities face each other, the rotor core 100 is in a more-magnetic-pole state. When the contrary polarities of adjacent two kinds of permanent magnets having different coercivities face each other, the rotor core 100 is in a fewer-magnetic-pole state.

It should be understood that that the two kinds of permanent magnets having different coercivities includes one kind of permanent magnet with a relatively lower coercivity (e.g., a lower-coercivity permanent magnet 200 shown in FIG. 1) and the other kind of permanent magnet with a relatively higher coercivity (e.g., a higher-coercivity permanent magnet 300 shown in FIG. 1). Accordingly, when a magnetization direction of the lower-coercivity permanent magnet changes, the higher-coercivity permanent magnet hardly changes. Therefore, the number of magnetic poles of the rotor core 100 may be changed to adapt to an operating state of the motor and improve motor efficiency finally. The rotor core 100 being in a more-magnetic-pole state refers to the rotor core 100 that has more magnetic poles than the rotor core 100 being in the fewer-magnetic-pole state does. The more-magnetic-pole state of the rotor core 100 also corresponds to a state of the motor having more magnetic poles. The rotor core 100 being in a fewer-magnetic-pole state refers to the rotor core 100 that has fewer magnetic poles than the rotor core 100 being in the more-magnetic-pole state does. The fewer-magnetic-pole state of the rotor core 100 also corresponds to a state of the motor having fewer magnetic poles.

When the motor operates at a low-speed and large-torque state, the motor changes a magnetization direction of the permanent magnet with the relatively lower coercivity in the rotor core 100 by means of an armature current, so that the identical polarities of the adjacent two kinds of permanent magnets having different coercivities face each other. In this case, the rotor core 100 is in a more-magnetic-pole state, thus the number of magnetic poles of the motor is relatively large, and the torque generated is relatively large. When the motor operates at a high-speed and small-torque state, the motor changes the magnetization direction of the permanent magnet with the relatively lower coercivity in the rotor core 100 by means of an armature current, so that the contrary polarities of the adjacent two kinds of permanent magnets having different coercivities face each other. In this case, the rotor core 100 is in a fewer-magnetic-pole state, thus the number of magnetic poles of the motor is reduced, and the generated torque is relatively small, but at a same electrical frequency, the rotation speed increases. Therefore, the motor rotor structure 10 is able to adjust an internal magnetic field according to the operation condition of the motor, so that the rotor core 100 has a more-magnetic-pole state and a fewer-magnetic-pole state, increasing a high-efficiency region of the motor and expanding an operation range of the motor.

In an embodiment, each of the first permanent magnet slots 110 and the adjacent second permanent magnet slot 120 thereof are spaced the preset distance apart. When the two kinds of permanent magnets having different coercivities are mounted in the first permanent magnet slot 110 and the second permanent magnet slot 120, respectively, the two kinds of permanent magnets having different coercivities are also spaced the preset distance apart. Since no magnet is arranged in a part (hereinafter referred to as an adjusting magnetic pole) of the rotor core 100 proximate to an outer circle of a rotor and corresponding to the interval position, the difficulty of magnetization is greatly reduced when the magnetization direction of the permanent magnet with a relatively lower coercivity is changed by means of an external armature current, which is conducive to a reduction of a magnetization current.

Figure 2:
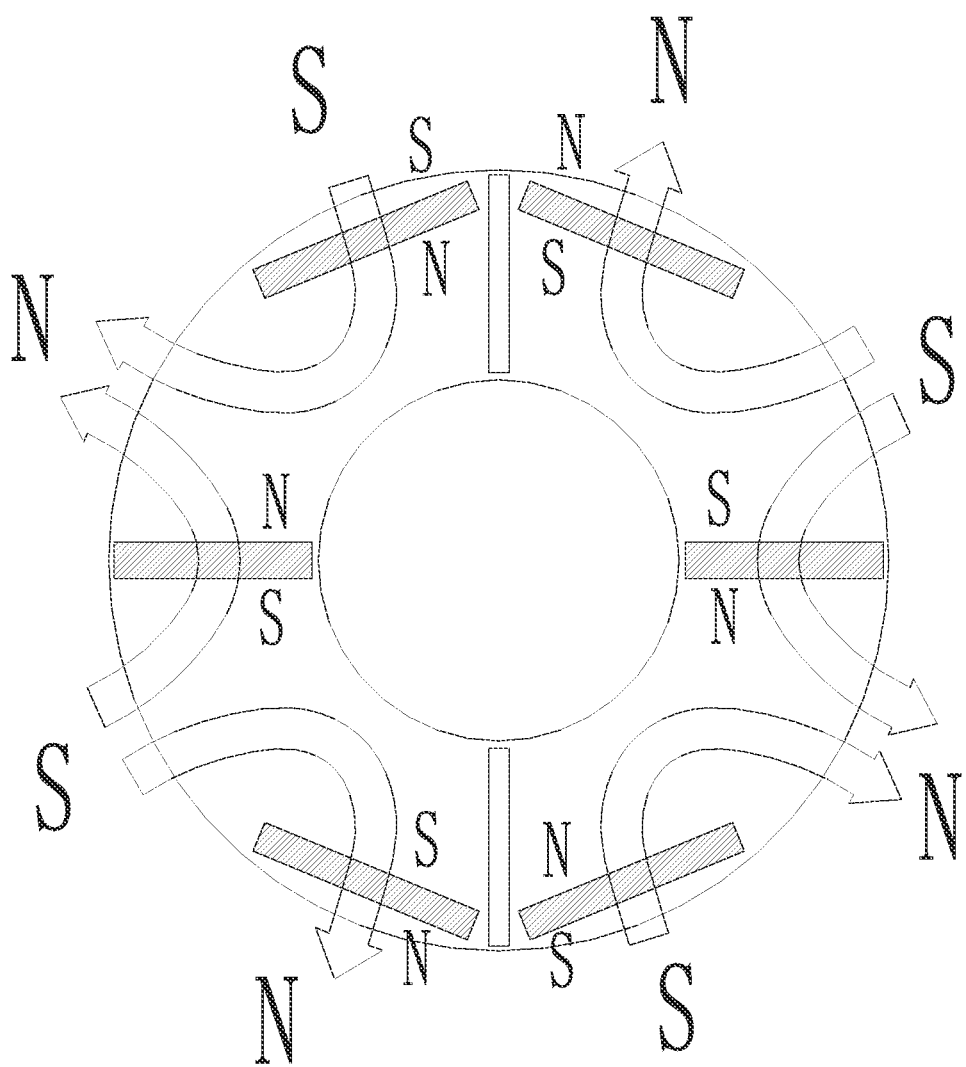
FIG. 2 is a diagram illustrating magnetic circuits in a rotor core of the structure shown in FIG. 1 when the rotor core is in a more-magnetic-pole state.
Figure 3:
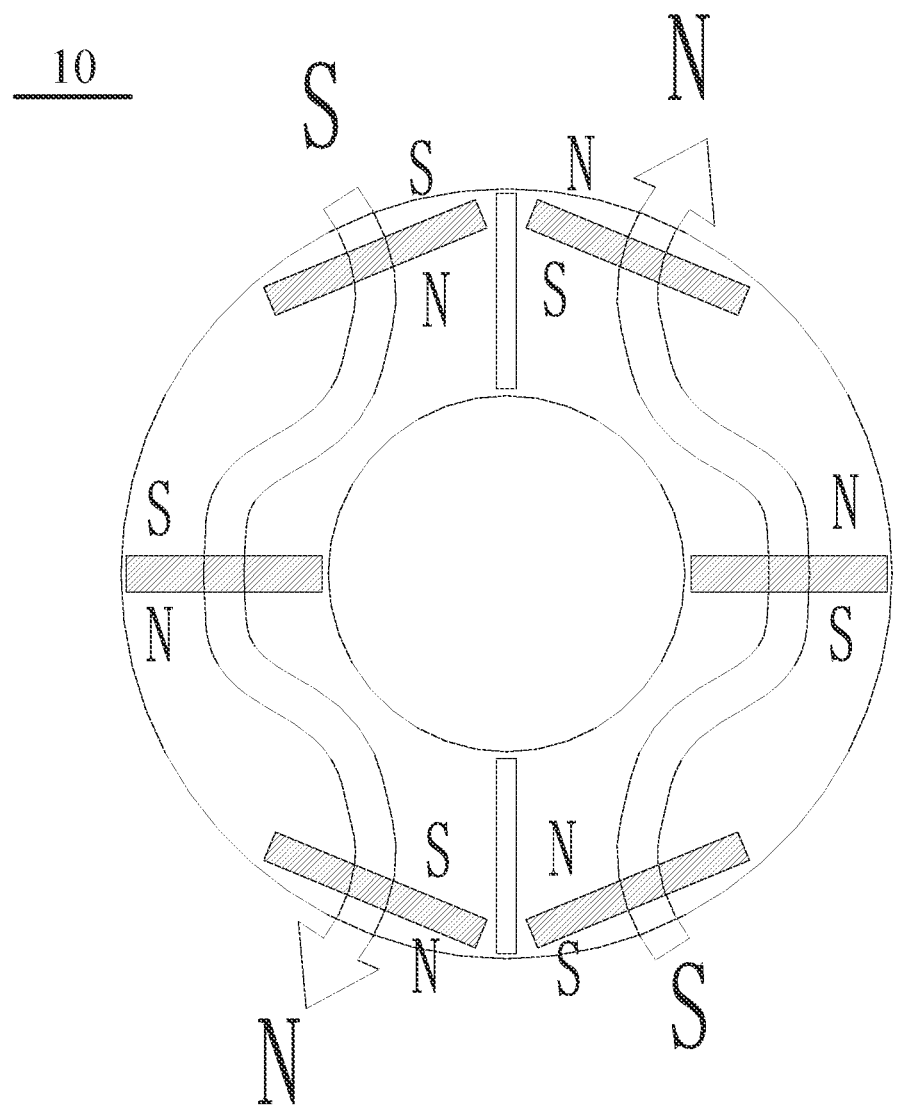
FIG. 3 is a diagram illustrating magnetic circuits in the rotor core of the structure shown in FIG. 1 when the rotor core is in a fewer-magnetic-pole state.

When the rotor core 100 is in a more-magnetic-pole state or fewer-magnetic-pole state, the adjusting magnetic pole also makes different changes accordingly. Referring to FIG. 2 and FIG. 3, the rotor core 100 has two states. In the rotor core 100, when the identical polarities of the permanent magnet with the relatively lower coercivity and the permanent magnet with the relatively higher coercivity face each other, the rotor core 100 is in a more-magnetic-pole state. A magnetic field of the adjusting magnetic pole is jointly provided by the permanent magnet with the relatively lower coercivity and the permanent magnet with the relatively higher coercivity, and the magnetic field of the adjusting magnetic pole enters a stator core. When the operating state of the motor changes to a high-speed small-torque state, the magnetization direction of the permanent magnet with the relatively lower coercivity is adjusted by means of a stator armature current, so that the contrary polarities of the permanent magnet with the relatively lower coercivity and the permanent magnet with the relatively higher coercivity face each other. In this case, the internal magnetic field of the rotor core 100 starts from the permanent magnet with the relatively lower coercivity and arrives at other permanent magnets each with a relatively higher coercivity, and no magnetic field of the adjusting magnetic pole enters the stator core, and the number of magnetic poles of the rotor core 100 decreases. Therefore, the motor rotor structure 10 can adjust an internal magnetic field according to the operating condition of the motor, so that the rotor core 100 has the more-magnetic-pole state and the fewer-magnetic-pole state, increasing the high-efficiency area of the motor and expanding the operating range of the motor.

In an embodiment, each of the first permanent magnet slots 110 may be a radial slot arranged in a radial direction of the rotor core 100. The first permanent magnet slot 110 may also be a tangential slot arranged in a tangential direction of the rotor core 100. The second permanent magnet slot 120 may be a radial slot arranged in a radial direction of the rotor core 100. The second permanent magnet slot 120 may also be a tangential slot arranged in a tangential direction of the rotor core 100. As an implementable manner, the first permanent magnet slot 110 is the radial slot arranged in the radial direction of the rotor core 100, and the permanent magnet mounted in the first permanent magnet slot 110 is magnetized in a tangential direction of the rotor core 100. When the first permanent magnet slot 110 is a radial slot, the second permanent magnet slot 120 may be a radial slot arranged in a radial direction of the rotor core 100 or a tangential slot arranged in a tangential direction of the rotor core 100. In an embodiment, the second permanent magnet slot 120 is the tangential slot arranged in the tangential direction of the rotor core 100. The second permanent magnet slot 120 is proximate to an outer circle of the rotor, and the permanent magnet mounted in the second permanent magnet slot 120 is magnetized in the radial direction of the rotor core 100.

In an embodiment, when the first permanent magnet slot 110 is the radial slot, between the two kinds of permanent magnets having different coercivities, the permanent magnet with the relatively lower coercivity is mounted in the first permanent magnet slot 110, while the permanent magnet with the relatively higher coercivity is mounted in the second permanent magnet slot 120. In one embodiment, the permanent magnet with the relatively lower coercivity is mounted in the second permanent magnet slot 120, while the permanent magnet with the relatively higher coercivity is mounted in the first permanent magnet slots 110. Referring to FIG. 1, as an implementable manner, the two kinds of permanent magnets having different coercivities include a lower-coercivity permanent magnet 200 and a higher-coercivity permanent magnet 300. The lower-coercivity permanent magnet 200 is mounted in the first permanent magnet slot 110, and the higher-coercivity permanent magnet 300 is mounted in the second permanent magnet slot 120. The lower-coercivity permanent magnet 200 is mounted in the first permanent magnet slot 110, which enables part of the outer circle of the rotor core at two sides of the lower-coercivity permanent magnets 200 not to be occupied, as the first permanent magnet slot 110 is arranged in the radial direction of the rotor core 100. When the magnetization direction of the lower-coercivity permanent magnet 200 needs to be changed, an external magnetic field, passing through part of the rotor core 100 at both sides of the lower-coercivity permanent magnets 200, directly acts on the lower-coercivity permanent magnet 200, reducing the magnetic resistance in a process of magnetizing the lower-coercivity permanent magnet 200, effectively reducing the difficulty of magnetization, and enabling the lower-coercivity permanent magnets 200 to be magnetized uniformly.

In one embodiment, one, two, or more second permanent magnet slots 120 may be disposed between the two adjacent first permanent magnet slots 110. Therefore, the structure of the rotor core 100 is more flexible, which is conducive to the arrangement of the two kinds of permanent magnets having different coercivities in the rotor core 100 according to actual design requirements, improving space utilization of the rotor core 100. Referring to FIG. 1 to FIG. 3, as an implementable manner, two second permanent magnet slots 120 are disposed between two adjacent first permanent magnet slots 110, and contrary polarities of two permanent magnets mounted in the two second permanent magnet slots 120 face each other, and a flux barrier slot 130 is disposed between the two second permanent magnet slots 120. As shown in FIG. 1, two second permanent magnet slots 120 are disposed between two adjacent first permanent magnet slots 110, that is, two higher-coercivity permanent magnets 300 are arranged between two adjacent lower-coercivity permanent magnets 200. The contrary polarities of the two higher-coercivity permanent magnets 300 face each other, and the flux barrier slot 130 is configured to isolate magnetic flux. In an embodiment, the flux barrier slot 130 has a thickness ranging from 2 g to 10 g, where g is an air gap of the motor. As shown in FIG. 1, d3 denotes a thickness of the flux barrier slot 130, and 2 g<d3<10 g is satisfied. The flux barrier slot 130 can be guaranteed to effectively isolate the magnetic flux by reasonably configuring the thickness of the flux barrier slot 130.

Referring to FIG. 2 and FIG. 3, FIG. 2 is a diagram illustrating magnetic circuits in the rotor core 100 in a more-magnetic-pole state. N and S at two sides of each permanent magnet in FIG. 2 illustrate a distribution of magnetic poles of each permanent magnet. N and S, at which the arrows in FIG. 2 direct, illustrate a distribution of magnetic poles of the rotor core 100 in a more-magnetic-pole state. FIG. 3 is a diagram illustrating magnetic circuits in the rotor core 100 in a fewer-magnetic-pole state. N and S at both sides of each permanent magnet in FIG. 3 illustrate a distribution of magnetic poles of each permanent magnet. N and S, at which the arrows in FIG. 3 direct, illustrate a distribution of magnetic poles of the rotor core 100 in a fewer-magnetic-pole state. As shown in FIG. 2, when the rotor core 100 is in the more-magnetic-pole state, the number of magnetic poles of the rotor core 100 is 8. As shown in FIG. 3, when the rotor core 100 is in the fewer-magnetic-pole state, the number of magnetic poles of the rotor core 100 is 4.

Referring to FIG. 1, in an embodiment, the lower-coercivity permanent magnet 200 has a coercivity H1 and a thickness d1, and the higher-coercivity permanent magnet 300 has a coercivity H2 and a thickness d2, and then $d2 \times H2/H1 \times 0.9 < d1 < d2 \times H2/H1 \times 1.1$ is satisfied. If the thickness of the lower-coercivity permanent magnets 200 is too small, the anti-demagnetization capability of the low-coercivity permanent magnet 200 may be insufficient, thus resulting in uncontrollable demagnetization of the motor during operation. If the thickness of the lower-coercivity permanent magnets 200 is too large, the difficulty of magnetization may be increased in a process of adjusting the magnetic field, thus increasing the magnetization current and making it difficult to adjust the magnetic field of the motor. The thickness of the lower-coercivity permanent magnets 200 is configured in such a manner that the anti-demagnetization capabilities of the two kinds of permanent magnets having different coercivities are ensured to be substantially identical, avoiding the problem of uncontrollable demagnetization of the motor during operation or the difficulty of adjusting the magnetic field of the motor.

Referring to FIG. 1, in an embodiment, the lower-coercivity permanent magnet 200 has residual magnetism Br1 and a width L1, and the higher-coercivity permanent magnet 300 has residual magnetism Br2 and a width of L2, and $L2 \times Br2/Br1 \times 0.1 < L1 < L2 \times Br2/Br1 \times 0.5$ is satisfied. In such a structure, the magnetic flux of the two kinds of permanent magnets having different coercivities can be ensured to be substantially identical, and the torque ripple of the motor can be ensured to be not too large.

Figure 4:
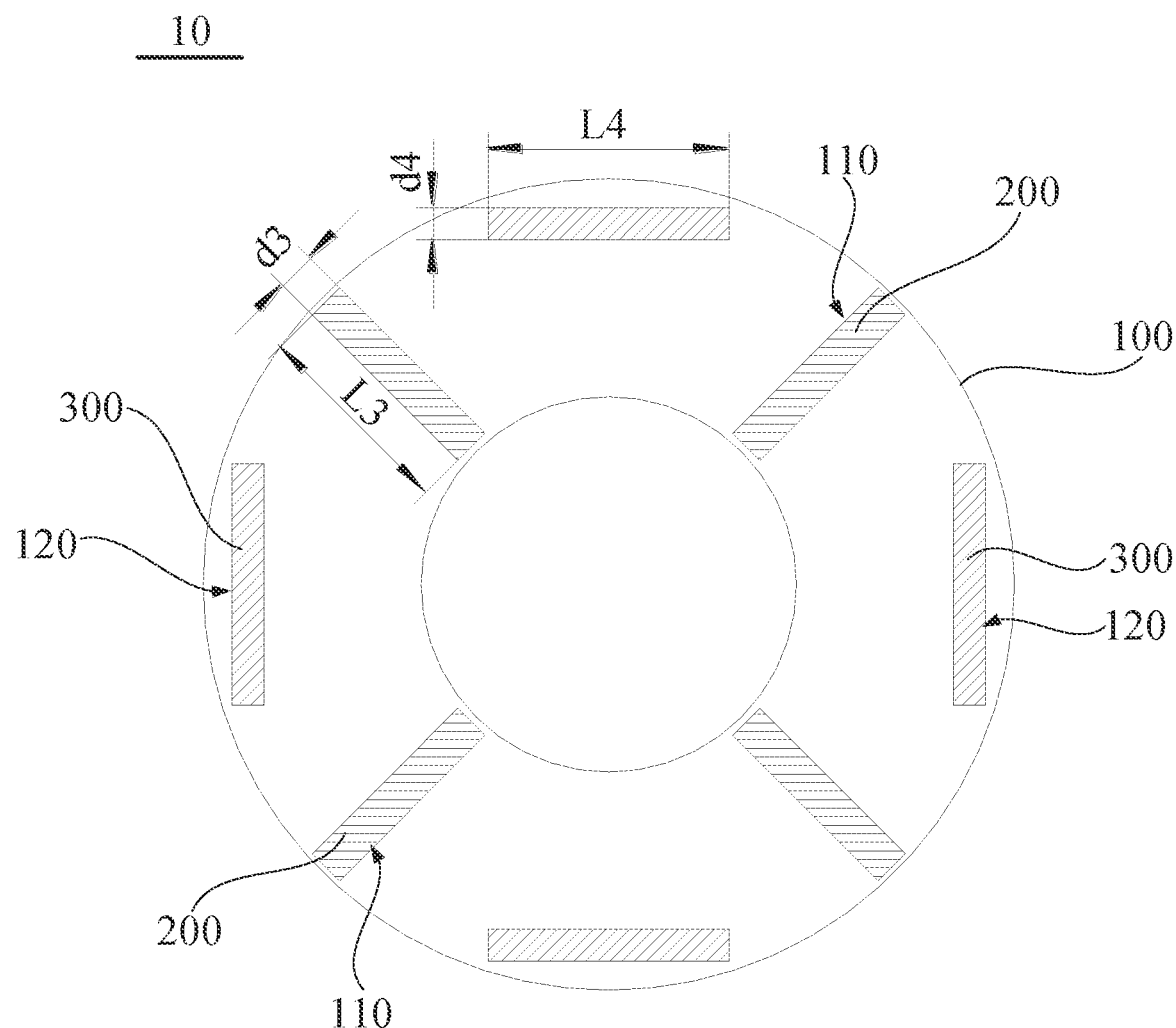
FIG. 4 is a schematic structural diagram illustrating the motor rotor structure according to another embodiment of the present disclosure.

Referring to FIG. 4, as another implementable manner, one second permanent magnet slot 120 is disposed between two adjacent first permanent magnet slots 110. As shown in FIG. 4, one second permanent magnet slot 120 is disposed between two adjacent first permanent magnet slots 110, that is, one higher-coercivity permanent magnet 300 is arranged between two adjacent lower-coercivity permanent magnets 200.

Figure 5:
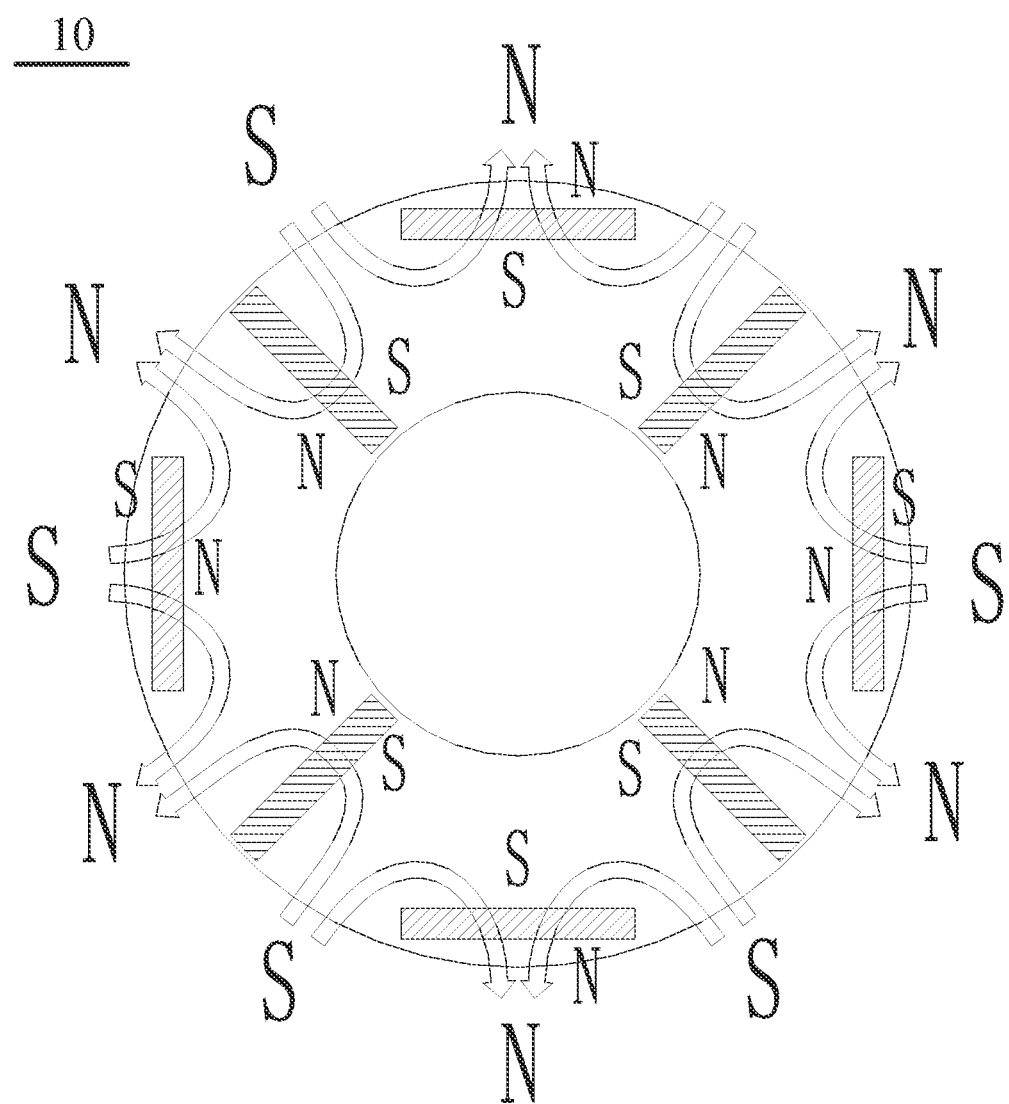
FIG. 5 a diagram illustrating magnetic circuits in the rotor core of the structure shown in FIG. 4 when the rotor core is in a more-magnetic-pole state.
Figure 6:
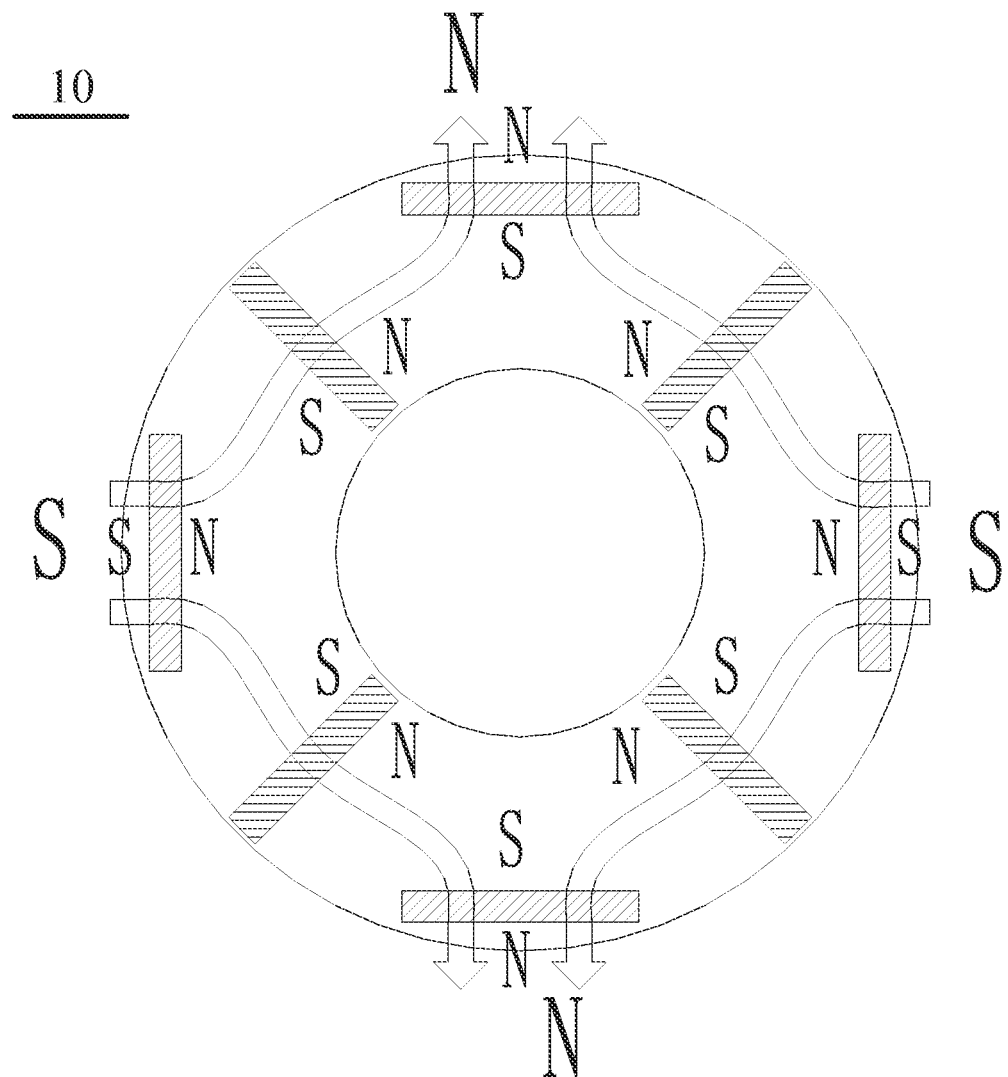
FIG. 6 a diagram illustrating magnetic circuits in the rotor core of the structure shown in FIG. 4 when the rotor core is in a fewer-magnetic-pole state.

Referring to FIG. 5 and FIG. 6, FIG. 5 is a diagram illustrating magnetic circuits in the rotor core 100 in a more-magnetic-pole state. N and S at both sides of each permanent magnet in FIG. 5 illustrate a distribution of magnetic poles of each permanent magnet. N and S shown in FIG. 5, at which the arrows direct, illustrate a distribution of magnetic poles of the rotor core 100 in a more-magnetic-pole state. FIG. 6 is a diagram illustrating magnetic circuits in the rotor core 100 in a fewer-magnetic-pole state. N and S at both sides of each permanent magnet in FIG. 6 illustrate a distribution of magnetic poles of each permanent magnet. N and S shown in FIG. 6, at which the arrows direct, illustrate a distribution of magnetic poles of the rotor core 100 in a fewer-magnetic-pole state. As shown in FIG. 5, when the rotor core 100 is in the more-magnetic-pole state, the number of magnetic poles of the rotor core 100 is 12. As shown in FIG. 6, when the rotor core 100 is in the fewer-magnetic-pole state, the number of magnetic poles of the rotor core 100 is 4.

Referring to FIG. 4, in an embodiment, the lower-coercivity permanent magnet 200 has a coercivity H3 and a thickness d3, and the higher-coercivity permanent magnet 300 has a coercivity H4 and a thickness d4, and $d4 \times H4/H3 \times 0.9 < d3 < d4 \times H4/H3 \times 1.1$ is satisfied. If the thickness of the lower-coercivity permanent magnet 200 is too small, the anti-demagnetization capability of the lower-coercivity permanent magnet 200 may be insufficient, thus resulting in uncontrollable demagnetization of the motor during an operation. If the thickness of the lower-coercivity permanent magnet 200 is too large, the difficulty of magnetization may be increased in a process of adjusting the magnetic field, thus increasing the magnetization current and making it difficult to adjust the magnetic field of the motor. The thickness of the lower-coercivity permanent magnets 200 is configured in such a manner that the anti-demagnetization capabilities of the two kinds of permanent magnets having different coercivities are ensured to be substantially identical, avoiding the problem of uncontrollable demagnetization of the motor during the operation or the difficulty of adjusting the magnetic field of the motor.

Referring to FIG. 4, in an embodiment, the lower-coercivity permanent magnet 200 has residual magnetism Br3 and a width L3, and the higher-coercivity permanent magnet 300 has residual magnetism Br4 and a width L4, and $L4 \times Br4/Br3 \times 0.3 < L3 < L4 \times Br4/Br3 \times 0.7$ is satisfied. In such a structure, the magnetic flux of the two permanent magnets having different coercivities can be ensured to be substantially identical, and the torque ripple of the motor can be ensured to be not too large.

Figure 7:
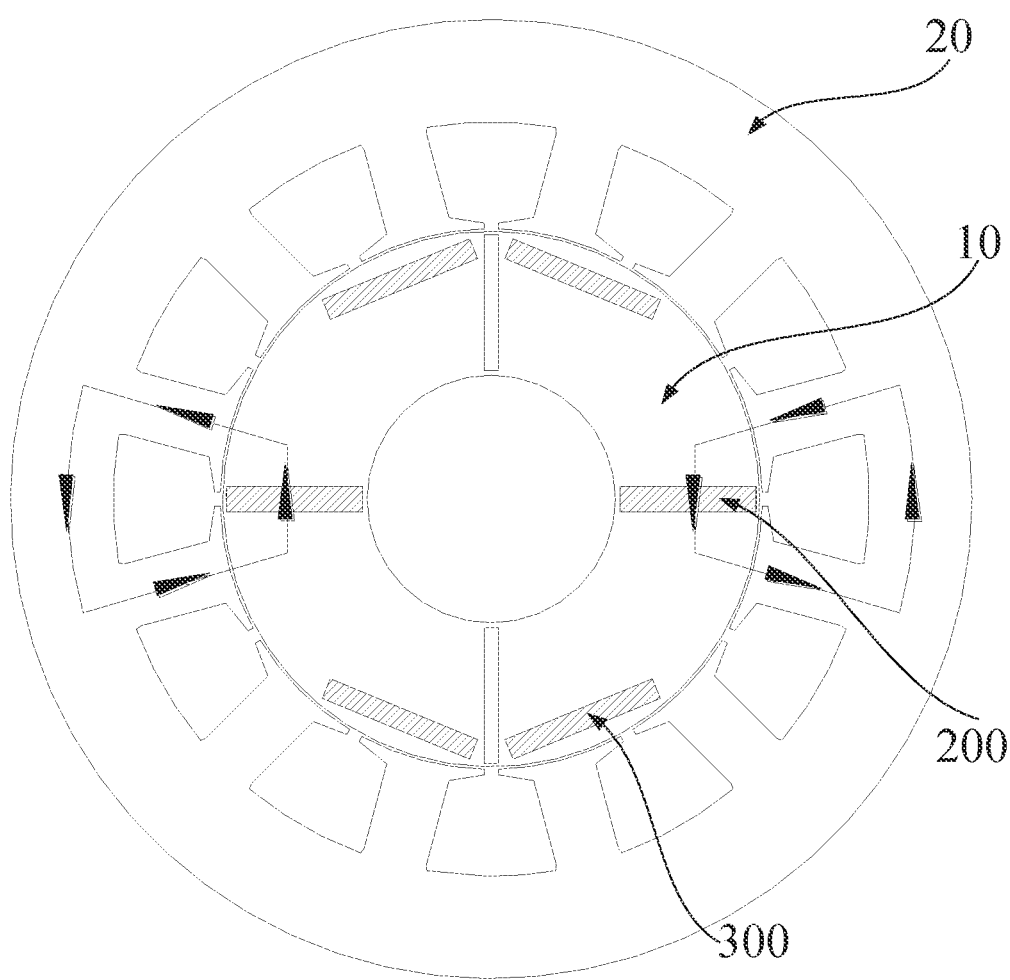
FIG. 7 is a schematic diagram illustrating magnetized magnetic circuits of a permanent magnet motor according to an embodiment of the present disclosure.

Referring to FIG. 7, an embodiment of the present disclosure further provides a permanent magnet motor, including a stator core 20 and a motor rotor structure 10. The motor rotor structure 10 is the motor rotor structure 10 of any one of the solutions described above. The paths each with arrows shown in FIG. 7 represent magnetic circuits of an external magnetic field applied to the lower-coercivity permanent magnets 200 in the rotor core 100. The external magnetic field is applied to the permanent magnets with the lower coercivity in the rotor core 100 to change the magnetization direction of the permanent magnet with the lower coercivity, so that the number of the magnetic poles of the motor rotor can be adjusted when the operating state of the permanent magnet motor changes, achieving the purpose of increasing a speed regulation range.

What is claimed is:

1. A motor rotor structure, comprising: a rotor core, wherein:
    at least two first permanent magnet slots are disposed in the rotor core in a circumferential direction;
    at least one second permanent magnet slot is disposed between every two adjacent first permanent magnet slots ; each of the first permanent magnet slots and an adjacent second permanent magnet slot thereof are spaced a preset distance apart; and
    between two kinds of permanent magnets having different coercivities, a first kind of permanent magnet is mounted in each of the first permanent magnet slots , and a second kind of permanent magnet is mounted in the second permanent magnet slot;
    when identical polarities of adjacent two kinds of permanent magnets having different coercivities face each other, the rotor core is in a more-magnetic-pole state; and when contrary polarities of adjacent two kinds of permanent magnets having different coercivities face each other, the rotor core is in a fewer-magnetic-pole state.

2. The motor rotor structure according to claim 1, wherein each of the first permanent magnet slots is a radial slot arranged in a radial direction of the rotor core, and the first kind of permanent magnet mounted in each of the first permanent magnet slots is magnetized in a tangential direction of the rotor core.

3. The motor rotor structure according to claim 2, wherein:
the second permanent magnet slot is a tangential slot arranged in a tangential direction of the rotor core;
the second permanent magnet slot is proximate to an outer circle of a rotor; and
the second kind of permanent magnet mounted in the second permanent magnet slot is magnetized in a radial direction of the rotor core.

4. The motor rotor structure according to claim 3, wherein:
the first and second kind of permanent magnets having different coercivities comprise a lower-coercivity permanent magnet and a higher-coercivity permanent magnet;
the lower-coercivity permanent magnet is mounted in each of the first permanent magnet slots; and
the higher-coercivity permanent magnet is mounted in the second permanent magnet slot.

5. The motor rotor structure according to claim 4, wherein:
two second permanent magnet slots are disposed between every two adjacent first permanent magnet slots;
contrary polarities of two higher-coercivity permanent magnets mounted in the two second permanent magnet slots face each other; and
a flux barrier slot is disposed between the two second permanent magnet slots.

6. The motor rotor structure according to claim 5, wherein:
the lower-coercivity permanent magnet has a coercivity H1 and a thickness d1;
the higher-coercivity permanent magnet has a coercivity H2 and a thickness d2; and $d2 \times H2/H1 \times 0.9 < d1 < d2 \times H2/H1 \times 1.1$.

7. The motor rotor structure according to claim 5, wherein:
the lower-coercivity permanent magnet has residual magnetism Br1 and a width L1;
the higher-coercivity permanent magnet has residual magnetism Br2 and a width L2; and $L2 \times Br2/Br1 \times 0.1 < L1 < L2 \times Br2/Br1 \times 0.5$.

8. The motor rotor structure according to claim 5, wherein the flux barrier slot has a thickness ranging from 2 g to 10 g, and g denotes an air gap of [a motor.

9. The motor rotor structure according to claim 4, wherein one second permanent magnet slot is disposed between every two adjacent first permanent magnet slots.

10. The motor rotor structure according to claim 9, wherein:
the lower-coercivity permanent magnet has a coercivity H3 and a thickness d3;
the lower-coercivity permanent magnets has a coercivity H4 and a thickness d4; and $d4 \times H4/H3 \times 0.9 < d3 < d4 \times H4/H3 \times 1.1$.

11. The motor rotor structure according to claim 9, wherein:
the lower-coercivity permanent magnet has residual magnetism Br3 and a width L3;
the higher-coercivity permanent magnet has residual magnetism Br4 and a width L4; and $L4 \times Br4/Br3 \times 0.3 < L3 < L4 \times Br4/Br3 \times 0.7$.

12. The motor rotor structure according to claim 3, wherein:
the first and second kind of permanent magnets having different coercivities comprise a lower-coercivity permanent magnet and a higher-coercivity permanent magnet;
the lower-coercivity permanent magnet is mounted in each of the first permanent magnet slots; and
the higher-coercivity permanent magnet is mounted in the second permanent magnet slot.

13. The motor rotor structure according to claim 2, wherein the second permanent magnet slot is a radial slot arranged in a radial direction of the rotor core.

14. The motor rotor structure according to claim 2, wherein:
the first and second kinds of two permanent magnets having different coercivities comprise a lower-coercivity permanent magnet and a higher-coercivity permanent magnet;
the higher-coercivity permanent magnet is mounted in each of the first permanent magnet slots; and
the lower-coercivity permanent magnet is mounted in the second permanent magnet slot.

15. A permanent magnet motor, comprising a stator core and a motor rotor structure, wherein the motor rotor structure is the motor rotor structure according to claim 1.

16. The motor rotor structure according to claim 1, wherein each of the at least two first permanent magnet slot is a tangential slot.

17. The motor rotor structure according to claim 16, wherein the second permanent magnet slot is a radial slot arranged in a radial direction of the rotor core.

18. The motor rotor structure according to claim 16, wherein the second permanent magnet slot is a tangential slot arranged in a tangential direction of the rotor core.

* * * * *